March 21, 1939.  J. BUGATTI  2,151,584
TESTING APPARATUS APPLICABLE MAINLY TO PARTS OF AIRCRAFT
Filed March 8, 1935  4 Sheets-Sheet 2
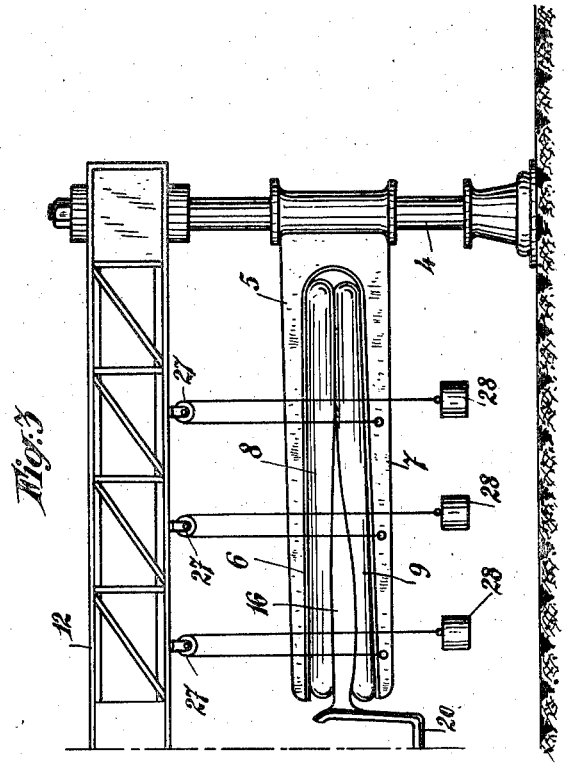
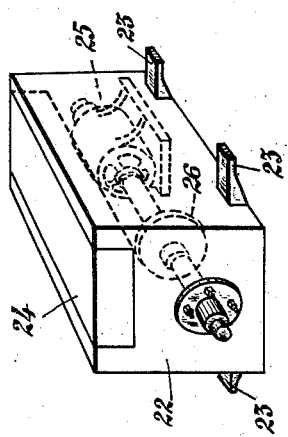
Inventor:—
Jean Bugatti
By Mauro + Lewis
Attorneys March 21, 1939. J. BUGATTI 2,151,584
TESTING APPARATUS APPLICABLE MAINLY TO PARTS OF AIRCRAFT
Filed March 8, 1935 4 Sheets-Sheet 3
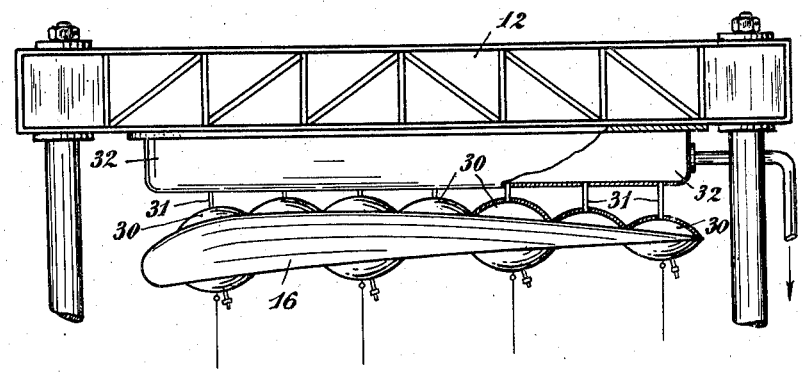
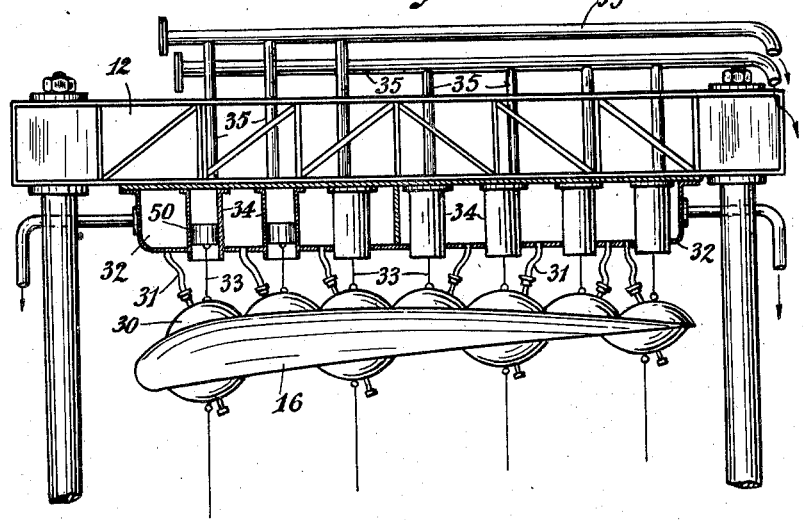

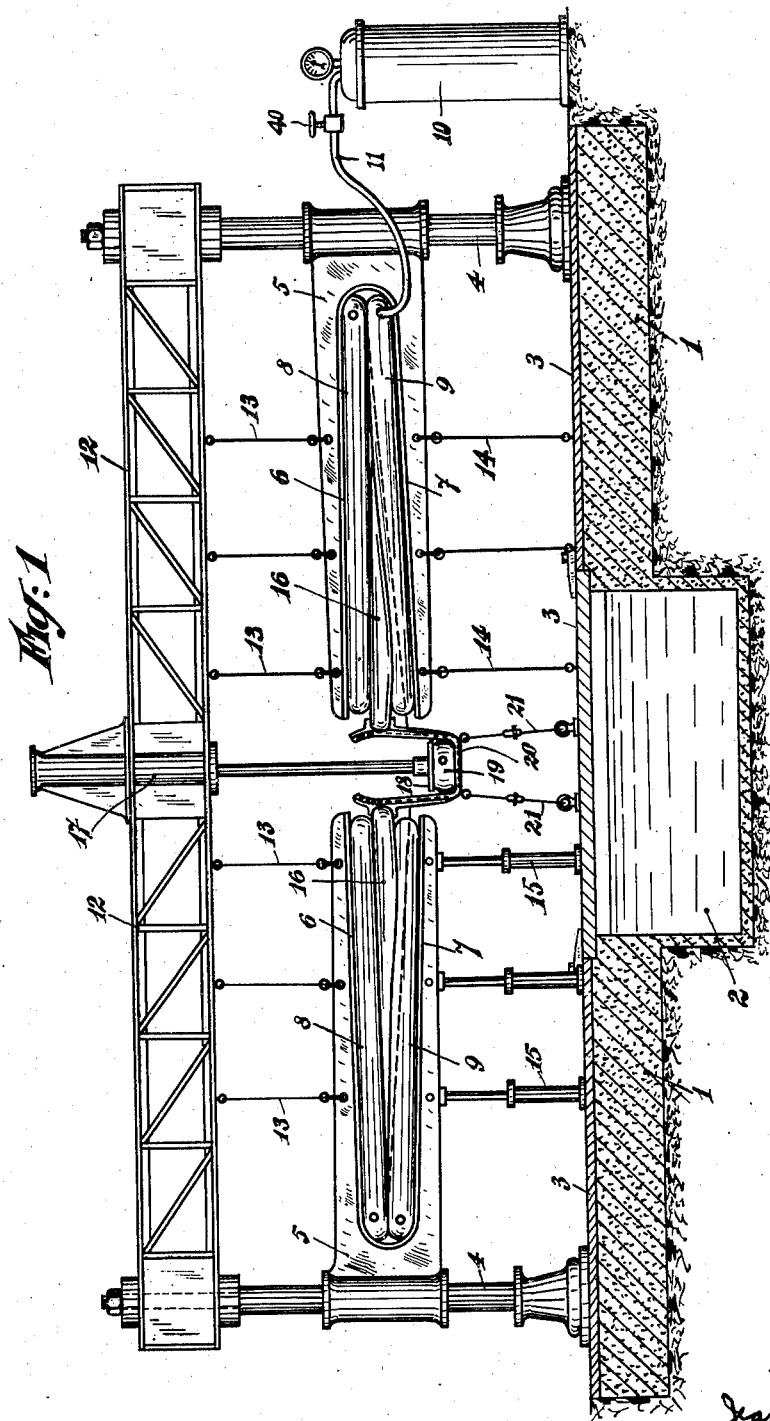

March 21, 1939.  J. BUGATTI  2,151,584
TESTING APPARATUS APPLICABLE MAINLY TO PARTS OF AIRCRAFT
Filed March 8, 1935  4 Sheets-Sheet 4

Inventor:-
Jean Bugatti
By Mauro + Lewis
Attorneys

Patented Mar. 21, 1939

2,151,584

UNITED STATES PATENT OFFICE 2,151,584

TESTING APPARATUS APPLICABLE MAINLY TO PARTS OF AIRCRAFT

Jean Bugatti, Molsheim, France

Application March 8, 1935, Serial No. 10,103
In France March 12, 1934

18 Claims. (Cl. 73—51)

Before actually using aeroplanes it is necessary from the point of view of safety to subject them and their constituent parts to resistance tests. At present the only serious tests normally carried out are purely static ones. Dynamic tests which are carried out in a tunnel are also employed, but these tests do not relate to prolonged resistance tests and the only result which can be obtained is the creation of conditions corresponding to normal flight. On the contrary, it is practically impossible to reproduce abnormal conditions which an aeroplane in use is liable to encounter and which nevertheless are more necessary as regards resistance tests. The static tests in which the wings are loaded, for example with a substantial number of bags of sand, can only furnish relative indications. These tests do not take into account the vibrations imparted by the engine.

The present invention has for its object an apparatus permitting of carrying out tests under very severe conditions which may be rendered very similar to those met in the most varied conditions encountered in flight.

In an apparatus made in accordance with my invention, a pneumatic or hydraulic pressure is applied to at least one of the surfaces of the element to be tested for instance through the medium of an inflatable bag, and the said element is subjected to vibrations and/or to pressure of a more or less substantial nature and more or less rapidly applied. In practice, it is desirable to grip the element over its whole extent or on the region desired, between two pneumatic or hydraulic bags which are inflated at identical or different pressures.

The apparatus made in accordance with my invention may be constructed as a test bench which has the following essential feature: for each of the elements to be tested the bench comprises one or two chambers for gas or liquid capable of being inflated to grip the element in question, and these chambers are supported by bases or metal plates or the like and are sufficiently strong to resist the forces developed. In particular, the bench may comprise two apparatus of this kind, capable of sliding on columns and adapted to grip the two wings of a monoplane, and a platform on which is mounted a press or like device, by the aid of which more or less intense pressure can be exerted on the fuselage or under-carriage of the aeroplane. A fluid chamber can be included between the plate of the press and the fuselage or under-carriage.

When carrying out tests, suitable mean pressures are first of all set up in the various fluid chambers; no other step needs be taken if it is desired to carry out a static test resistance. If it is desired to carry out dynamic tests, the engine is fitted to the fuselage and caused to rotate in order to set up vibrations. The engine can be replaced or completed by any suitable vibrating apparatus; for example, there may be employed a casing containing an engine having an unbalanced flywheel. Shocks may be set up periodically or otherwise by utilising in addition to the fluid chambers a pressure fluid container by means of which waves or whiffs of fluid are sent into one or more of the chambers by rapid opening of valves; shocks similar to those which are caused by violent air currents are thus obtained.

An aeroplane may be tested on its wheels, or in the case of an hydroplane on its floats, a container being in the latter case arranged beneath the test bench.

In a simplified form, the testing apparatus may comprise plates fitted on to one surface with a pneumatic or hydraulic cushion. The element to be tested, for example a wing, is arranged between two sets of plates, the upper plate being loaded by weights evenly distributed over the wing by means of the cushion mentioned above. The lower plate may be tensioned by springs or by weights with pulleys secured for example to a platform.

For certain tests the apparatus may be placed in a hermetically sealed chamber, or the chamber in which the apparatus is carried may be hermetically sealed, thus permitting of carrying out the tests in an artificial atmosphere or at any desired temperature.

The engine or the vibrating device may, if desired, be placed outside the casing and exert its normal influence on the element being tested by means of shafts having universal joints, these shafts passing through the walls of the chamber.

According to a modification, the apparatus serves to the testing of an airplane, or a part thereof, through the action of suction, by means of sucking members suitably distributed over the upper or under, or both, surfaces of the wings, or other parts of the airplane.

The following description read in connection with the attached drawings, which are given by way of example, will enable the manner in which the invention can be carried out to be understood.

Fig. 1 is an elevation partly in section of a test bench for aeroplanes.

Fig. 2 is a perspective and diagrammatic view of vibrating apparatus used in the tests.

Fig. 3 is a half-view in elevation of a slightly modified test bench.

Figs. 4 and 5 illustrate two different embodiments, respectively, of a modification in which suction is utilized.

Figure 6:
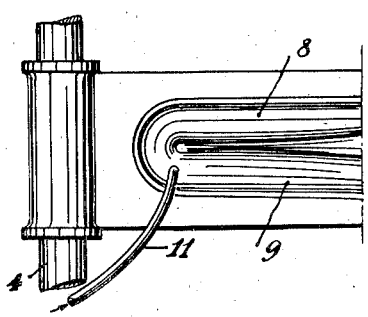
Figs. 6 and 8 are fragmentary views, illustrating modifications of the apparatus shown in Fig. 1.

The test bench shown diagrammatically in Fig. 1 rests on a mass of concrete 1 provided at its central part with a tank 2 serving for the testing of hydroplanes. The mass 1 is surmounted by a pedestal, which is preferably formed of plates of flagstones 3 having numerous holes to permit of the rapid fixing of the various elements (such as jacks 15 and anchors for tensioning device 21 to be described later on) accurately and rigidly. Strong columns 4, for example two in number, are mounted on the foundation thus formed; these columns are connected at their upper parts with a platform 12. Metal jaws 5 can slide on the columns, the inner faces 6 and 7 of these jaws serving to receive the chambers or bags 8 and 9 capable of inflation. The chambers 8 and 9, which if desired may be united into a single chamber as shown on Fig. 6, and are connected to one or more sources of fluid under pressure; there is shown diagrammatically on the drawings a high pressure fluid container 10 connected by a flexible pipe 11 provided with a valve 40 to the chamber 9 at the right hand part of the apparatus. The jaws 5 can be held stationary in a predetermined pjosition in any suitable manner. In the drawings they are shown suspended from the platform 12 by cables 13; also they may be connected to the plate 3 by tensioning members 14. Also, if desired, pneumatic jacks or cylinders 15 might be employed, and these of course can be secured below or above the jaw, that is to say in the latter case to the platform 12.

With an apparatus thus constructed it will be seen that it is possible to grip the wings 16 of an aeroplane to be tested between the two chambers 8 and 9, to inflate these chambers to the same or different pressures, and in addition to subject the jaws to a pull or thrust which urges them either towards the platform or towards the base. It is thus easy to carry out static tests and these tests are performed under better conditions than if, according to present practice, one would merely load the upper surface of the wings with a number of sacks of sand.

At its central part the platform is provided with a press or the like 17 which imparts vertical movement to a plate 18; the press may be carried by a carriage movable along the platform. The plate 18 is preferably furnished on its lower surface with a bag 19 containing fluid, and by means of the latter, pressure which can be regulated at will is exerted on the base of the fuselage 20 of the aeroplane. The press may also be constructed so as to exert an upward pull on the under-carriage; in this case, the bag 19 is placed above the plate 18, the rod of the press being adapted to traverse the base of the under-carriage. Instead of or in addition to the press, a tensioning device 21 may be employed. The aeroplane may also be fitted with its landing wheels or its float and may rest either on the central plate 3, which is preferably removable, or on the liquid contained in the tank 2.

To carry out tests which would take into account vibrations set up by an engine, the latter is mounted on the fuselage 20 and may be caused to rotate at its normal speed. At the same time, substantial vibrations may be set up in one or both of the chambers 8 and 9. For that purpose, it suffices for instance to operate valves such as that shown at 40, so as to admit pressure fluid suddenly by whiffs into chambers 8 and 9, or to discharge fluid from the latter through a valve (not shown) on such a chamber.

Instead of using an ordinary motor to set up vibrations, a vibratory apparatus which is the same for all the tests, could be employed simultaneously with the aeroplane engine. A vibratory apparatus of this kind is shown diagrammatically in Fig. 2. It consists essentially of a casing 22 provided with cramps 23 and being provided preferably with an additional mass 24 forming an extra load. In the interior of the casing is an engine 25, for example an electric motor, driving an excentric flywheel 26. The engine is placed in the interior of the fuselage, for example in the under-carriage, and held in place by the cramps 23, and it is caused to rotate for a certain period at a predetermined speed, for example at the speed of engines as actually used, say about 1500 revolutions per minute.

Figure 7:
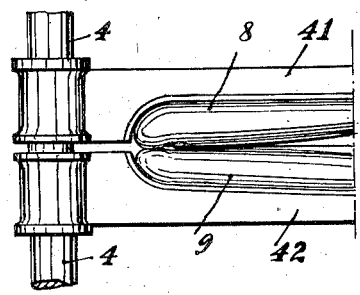
Fig. 7 is a fragmentary view, illustrating the use of separate plates instead of a jaw, in the apparatus according to Fig. 3.

As shown on Fig. 3, the jaws 5, instead of being connected to the platform 12 by cables, 13 may be suspended therefrom or be pulled towards the same (the latter function is performed in the case of Fig. 1 by cables 13 and/or jacks 15) by means of pulleys 27 and counter-weights 28. Instead of the jaws 5, separate plates 41 and 42 (Fig. 7) could be used; in this case, the upper plate may be loaded by weights, for example sand bags.

Figure 8:
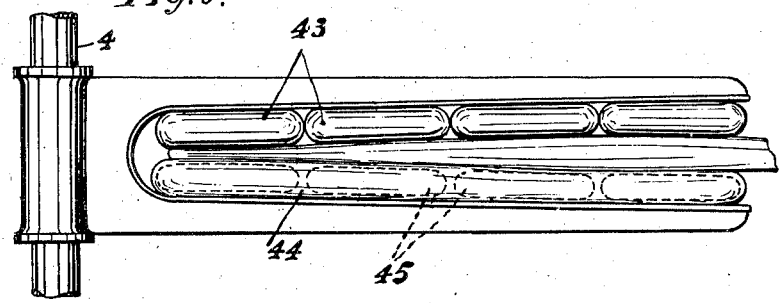

It is obvious that numerous modifications of detail could be introduced into the forms of construction described without departing from the scope of the invention. For instance, with each of the plates carrying the fluid chambers or bags, could be associated a plurality of fluid chambers 43 (Fig. 8) or one chamber 44 divided into compartments 45 which are inflated at the same or different pressures. Owing to their construction, the fluid chambers can occupy any desired position, and may consequently be employed for testing parts of an aeroplane such as the rudders or the ailerons. The apparatus may be employed to test an aircraft with a number of planes and as many elements as is necessary to carry out the same tests.

Finally the invention may obviously be employed for testing any form of mechanical element and not merely for testing aeroplanes.

In the arrangement shown by Fig. 4, the wing 16 of an airplane, which is assumed to be attached to the fuselage (not shown), the latter being held by tensioning devices as shown on Fig. 1, is subjected to the action of sucking members 30 connected through conduits 31 with a vacuum tank 32 fixed to the stationary frame 12. The lower cups with their depending cables play substantially the same part as cables 14 shown on Fig. 1, being likewise attached to the base plate 3.

In the embodiment of Fig. 5, the sucking members are connected to a vacuum tank 32 and are themselves subjected to traction stresses, through cables 33 and pistons 50 movable in cylinders 34 (in the top part of which a vacuum is transmitted through pipes 35), or through any other means.

The sucking members may, of course, be distributed in groups, each connected to a vacuum chamber whereby the intensity of the vacuum may be different in the groups corresponding to the different chambers respectively. The sucking members may extend over either the whole or a portion of the surface of the wing.

Figure 9:
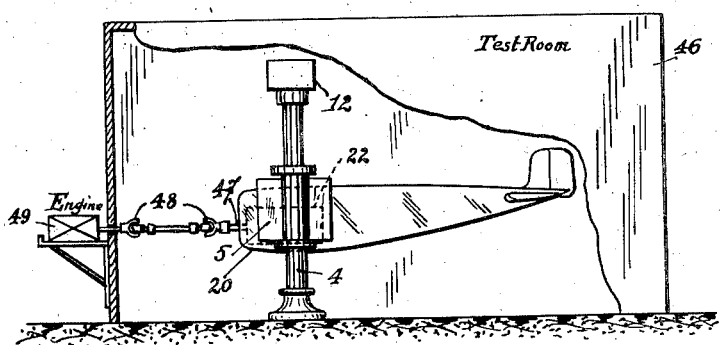
Fig. 9 is a diagrammatic elevation view with parts broken away, showing a sealed test chamber with the vibration generating engine mounted outside.

As shown on Fig. 9, the testing apparatus may be confined in a hermetically sealed chamber or test room 46 whereby tests may be made in an artificial atmosphere or at any desired temperature. The testing apparatus shown on Fig. 9 is the same as shown on Fig. 1; a vibrating apparatus 22 is placed in the fuselage 20 of an aircraft to be tested and its shaft 47 is coupled through connecting shafts including universal joints 48 and passing through a wall of room 46, with an engine 49 disposed outside said room for driving the vibrating apparatus.

What I claim is:

1. An apparatus for testing the resistance of a substantially flat-shaped structure, for instance an airplane or a part of an airplane, which comprises, in combination, a rigid support, two rigid plates carried by said support, so as to extend on either side of at least one portion of said structure in substantially parallel relation thereto, two flexible bags adapted to be inflated with a fluid arranged to be interposed between either face of said structure and the corresponding plate respectively, and means for strongly applying said bags against said faces of the structure respectively.

2. An apparatus for testing the resistance of a substantially flat-shaped structure, for instance an airplane or a part of an airplane, which comprises, in combination, a rigid member including two parallel flat parts between which at least one part of said structure can be placed, two flexible bags adapted to be inserted between the faces of said structure and said parts respectively, and a fluid pressure source, and means for establishing communication between said source and said bags whereby said structure is strongly held therebetween.

3. An apparatus for testing the resistance of a substantially flat-shaped structure, for instance an airplane or a part of an airplane, which comprises, in combination, a frame, rigid elements carried by said frame adapted to act on different parts of said structure in opposite directions respectively, so as to produce stresses therein, at least one flexible bag, inflated with a fluid interposed between each of said rigid elements and the corresponding part of said structure, and means for controlling the movements of at least one of said elements for producing the desired stresses in said structure.

4. An apparatus for testing the resistance of a substantially flat shaped structure, for instance an airplane or a part of an airplane, which comprises, in combination, a frame, at least one column in said frame, at least one rigid member, of U-shaped section in a plane parallel to said column, slidably carried by said column, the branches of the U consisting of plates transverse to the direction of said column, whereby one part of said structure can be placed in the space between said branches, flexible bags inflated with a fluid under pressure interposed between each face of said structure and the corresponding branch, and means for exerting on the part of said structure that is not located between said branches an effort substantially parallel to said column.

5. An apparatus for testing the resistance of an airplane, which comprises, in combination, a frame, vertical columns in said frame, two rigid members of U-shaped vertical section slidably carried by said columns respectively, the branches of the U consisting of substantially horizontal plates, so that each wing of said airplane can be inserted in the space between the plates of each rigid member, respectively, flexible bags inflated with a fluid under pressure interposed between at least one face of each wing and the corresponding horizontal plate, and means for producing on the fuselage and that face of each wing which is separated by the corresponding horizontal plate by a flexible bag, reaction forces directed in opposite directions parallelly to said columns.

6. An apparatus for testing the resistance of an airplane which comprises, in combination, a frame, vertical columns in said frame, two rigid members of U-shaped vertical section slidably carried by said columns respectively, the branches of the U consisting of substantially horizontal plates, so that each wing of said airplane can be inserted in the space between the plates of each rigid member, respectively, flexible bags inflated with a fluid under pressure interposed between each face of each wing and the corresponding branch of one of said rigid members, means for fixing said members in a predetermined position along said columns respectively and means for exerting a vertical force on the fuselage of said airplane.

7. An apparatus for testing the resistance of an airplane which comprises, in combination, a frame, vertical columns in said frame, two rigid members of U-shaped vertical section slidably carried by said columns respectively, the branches of the U consisting of substantially horizontal plates, so that each wing of said airplane can be inserted in the space between the branches of each rigid member respectively, flexible bags inflated with a fluid under pressure interposed between each face of each wing and the corresponding branch of one of said rigid members, means for moving said rigid members vertically in said frame, and means acting on the fuselage of said airplane for opposing this movement.

8. An apparatus according to claim 7 in which the means for moving said rigid members include pulleys carried by the upper part of said frame, cables fixed at one end to said members and passing around said pulleys respectively, and counterweights fixed to the other ends of said cables respectively.

9. An apparatus according to claim 5 in which the last mentioned means include at least one press carried by said frame and adapted to act on one part of said airplane.

10. An apparatus according to claim 5 further including sources of fluid under pressure connected with said bags respectively, and valve means for controlling the pressure transmitted from said source to said bags.

11. An apparatus according to claim 5 further including a reservoir filled with water at the lower part of said plane adapted to receive the floating part of an hydroplane.

12. An apparatus according to claim 5 further including means adapted to be connected with a part of said airplane for transmitting vibrations thereto.

13. An apparatus for testing an airplane having a body portion and two wings extending laterally therefrom on either side of said body, which comprises in combination a frame, means, including pressure transfer flexible walls directly exposed on one side to superatmospheric pressure and adapted for direct contact on the other side with the top and bottom surfaces of the wings for applying superatmospheric fluid pressure to said top and bottom surfaces of the wings, rigid backing members for said means, means for securing said backing members to said frame during a test, and means operatively associated with the first-named means for varying the super atmospheric fluid pressure applied to said flexible walls.

14. An apparatus for testing an airplane having a body portion and two wings extending laterally therefrom on either side of said body portion, which comprises in combination a frame; means for applying superatmospheric fluid pressure to the top and bottom surfaces of said wings; rigid members for backing said means; means for securing, in operation, said backing members to said frame; and means on said frame for simultaneously stressing the body portion of the airplane.

15. An apparatus for testing an airplane having a body portion and two wings extending laterally therefrom on either side of said body portion, which comprises in combination a frame, inflated flexible bags adapted to clamp the top and bottom surfaces of said wings, rigid means for backing said inflated flexible bags from said frame, an inflated flexible bag arranged in operative contact with said body portion, and means on said frame for applying pressure to the last named bag so as to transfer said pressure to the body portion.

16. An apparatus for testing airplane surface structures which comprises in combination, a frame, one or more flexible hollow members adapted for direct contact and conformity with opposite surfaces of said structure, a source of fluid pressure at other than atmospheric pressure, means for establishing communication between said source and said hollow members, and reacting means operatively connecting said hollow members with said frame.

17. An apparatus according to claim 16 wherein said hollow flexible members are cup-shaped suction members.

18. An apparatus according to claim 16 further including means for exerting a pull on said hollow members.

JEAN BUGATTI.